US009891757B2

(12) United States Patent
Modafe

(10) Patent No.: US 9,891,757 B2
(45) Date of Patent: Feb. 13, 2018

(54) ELASTIVE SENSING

(75) Inventor: Alireza Modafe, Cupertino, CA (US)

(73) Assignee: Synaptics Incorporated, San Jose, CA (US)

(*) Notice: Subject to any disclaimer, the term of this patent is extended or adjusted under 35 U.S.C. 154(b) by 2220 days.

(21) Appl. No.: 12/643,125

(22) Filed: Dec. 21, 2009

(65) Prior Publication Data

US 2011/0153243 A1 Jun. 23, 2011

(51) Int. Cl.
G01R 31/36 (2006.01)
G06F 3/044 (2006.01)

(52) U.S. Cl.
CPC .................... G06F 3/044 (2013.01)

(58) Field of Classification Search
USPC ............ 702/64, 66, 150, 189; 345/173, 204; 178/18.06; 73/862.625
See application file for complete search history.

(56) References Cited

U.S. PATENT DOCUMENTS

| 5,495,077 | A | 2/1996 | Miller et al. |
| 5,841,078 | A | 11/1998 | Miller et al. |
| 5,861,875 | A | 1/1999 | Gerpheide |
| 2007/0124674 | A1* | 5/2007 | Liao et al. ................ 715/702 |
| 2008/0078590 | A1* | 4/2008 | Sequine .................. 178/18.06 |
| 2009/0115432 | A1* | 5/2009 | Taniguchi et al. ......... 324/690 |
| 2010/0308844 | A1* | 12/2010 | Day et al. ................ 324/663 |
| 2011/0148435 | A1* | 6/2011 | Schwartz et al. ......... 324/658 |

OTHER PUBLICATIONS

Zhao et al., 'Electrically Floating Conductivity Detection System for Capillary Electrophoresis', 1998, Jounal of Chromatography, pp. 205-208.*

* cited by examiner

Primary Examiner — Elias Desta
(74) Attorney, Agent, or Firm — Osha Liang LLP

(57) ABSTRACT

An elastive sensor device comprises a set of sensor electrodes and a processing system. The processing system is configured to acquire an elastive measurement by emitting an electrical signal with a first subset of the set of sensor electrodes and receiving the electrical signal with a second subset of the set of sensor electrodes. The processing system is further configured to determine positional information using the elastive measurement.

21 Claims, 13 Drawing Sheets

1000

ACQUIRE AN ELASTIVE MEASUREMENT BY EMITTING AN ELECTRICAL SIGNAL WITH A FIRST SUBSET OF A SET OF SENSOR ELECTRODES OF AN ELASTIVE SENSOR DEVICE AND RECEIVING THE ELECTRICAL SIGNAL WITH A SECOND SUBSET OF THE SET OF SENSOR ELECTRODES.
1010

DETERMINE POSITIONAL INFORMATION OF AN INPUT OBJECT USING THE ELASTIVE MEASUREMENT.
1020

1000

ACQUIRE AN ELASTIVE MEASUREMENT BY EMITTING AN ELECTRICAL SIGNAL WITH A FIRST SUBSET OF A SET OF SENSOR ELECTRODES OF AN ELASTIVE SENSOR DEVICE AND RECEIVING THE ELECTRICAL SIGNAL WITH A SECOND SUBSET OF THE SET OF SENSOR ELECTRODES.
1010

DETERMINE POSITIONAL INFORMATION OF AN INPUT OBJECT USING THE ELASTIVE MEASUREMENT.
1020

ELASTIVE SENSING

BACKGROUND

Touch sensing and multitouch sensing are key technologies in the implementation of sophisticated modern human-machine interfaces. Touch sensing can involve sensing the proximity, contact, and/or position of an object such as, for example, a finger, stylus or other object. Multitouch sensing can involve similar sensing with respect to multiple simultaneous input objects. As such, multitouch gestures are now being implemented in almost every electronic device that has a touch interface. Typical touch sensing and multitouch sensing systems are based on measures of absolute or mutual capacitance. One example of multitouch sensing is multitouch imaging, which can involve capturing transcapacitive images relative to an input interface/sensor.

BRIEF DESCRIPTION OF THE DRAWINGS

The accompanying drawings, which are incorporated in and form a part of the Description of Embodiments, illustrate various embodiments of the present invention and, together with the Description of Embodiments, serve to explain principles discussed below. The drawings referred to in this Brief Description of Drawings should not be understood as being drawn to scale unless specifically noted.

FIG. 2A illustrates a plan view while

FIG. 3A illustrates a plan view while

FIG. 4A illustrates a plan view while

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

Elastance, which has units of Darafs, is the inverse of capacitance. Sensor devices and methods described herein utilize measures of elastance to sense one or more inputs relative to a sensor of one or more sensor electrodes.

The discussion will begin with description of an example elastive sensor device with which or upon which various embodiments described herein may be implemented. Several non-inclusive example configurations of sensor electrodes and sets of sensor electrodes, which can be used with a transelastive sensor device, will be described. An example transelastive image in an elastive space will be described in conjunction with description of an example transelastive pixel image of the transelastive space. The transelastive image and transelastive pixel image will be compared and contrasted with an equivalent example transcapacitive image and an example transcapacitive pixel image. Operation of the elastive sensor device will then be described in more detail in conjunction with description of an example transcapacitive/transelastive equivalent pixel and an example method of ascertaining positional information of an input object.

Example Elastive Sensor Device

Figure 1:
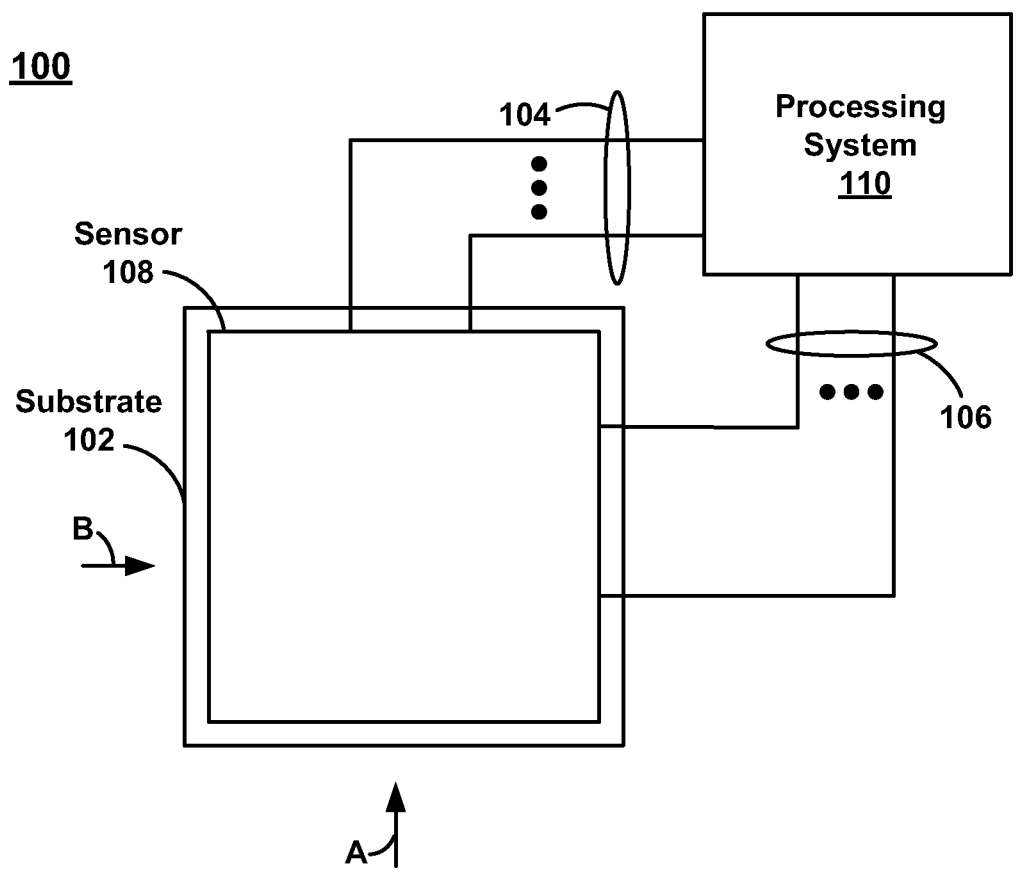
FIG. 1 is a plan view block diagram of an example elastive sensor device that can be implemented to include one or more embodiments of the invention.

FIG. 1 is a plan view block diagram of an example elastive sensor device 100 that can be implemented to include one or more embodiments of the present invention. In FIG. 1, arrows A and B represent directions from which elevation details of FIGS. 2B, 3B, and 4B are viewed from. The elastive sensor device 100 can be utilized to communicate user input (e.g., using a user's finger, a probe such as a stylus, and/or some other external input object) to a computing device or other electronic device. For example, elastive sensor device 100 can be implemented as an elastive touch screen device that can, in some embodiments, be placed over an underlying image or an information display device (not shown). In this manner, a user would view the underlying image or information display by looking through the substantially transparent sensor electrodes (not illustrated) in sensor 108 of elastive sensor device 100 as shown. It is noted that one or more embodiments in accordance with the present invention can be incorporated with an elastive touch screen device similar to that of elastive sensor device 100.

When in operation, sensor 108 is used to form a "sensing region" for sensing inputs. "Sensing region" as used herein is intended to broadly encompass any space above, around, in and/or near the sensor device wherein the sensor is able to detect an input object. In a conventional embodiment, a sensing region, such as that formed by sensor 108, extends from a surface of the sensor device in one or more directions into space until the noise and decreased signal prevent accurate object detection. This distance may be on the order of less than a millimeter, millimeters, centimeters, or more, and may vary significantly with the type of position sensing technology used and the accuracy desired. Accordingly, the planarity, size, shape and exact locations of the particular sensing regions can vary widely from embodiment to embodiment.

Sensing regions with rectangular projected shape are common, and many other shapes are possible. For example, depending on the design of the sensor pattern and surrounding circuitry, shielding from any input objects, and the like, sensing regions can be made to have two-dimensional projections of other shapes. Similar approaches can be used to define the three-dimensional shape of the sensing region. For example, any combination of sensor design, shielding, signal manipulation, and the like can effectively define a sensing region that a distance in the third dimension.

The elastive sensor device 100, when implemented as a touch screen, can include a substantially transparent substrate 102 having a first set of conductive routing traces 104 and a second set of conductive routing traces 106 patterned (or formed) coupled there to. Conductive routing traces 104 and/or 106 can be utilized for coupling processing system 110 with any sensor electrodes, arrays of sensor electrodes, and/or conductive traces that form a sensor 108. Although sensor 108 is depicted as rectangular, other shapes, such as circular are anticipated. Sensor electrodes of sensor region 108 can be formed of a substantially transparent conductive material. Indium tin oxide (ITO) is but one example of a substantially transparent conductive material that can be used to form one or more sensor electrodes or conductive traces of sensor 108.

Processing system 110 drives sensor electrode(s) with a voltage or charge and senses resulting respective charge or voltage on sensor electrode(s), to acquire one or more measurements of elastance (and in some embodiments capacitance) with respect to sensor 108. Such measurement(s) of elastance by processing system 110 enable the sensing of contact or other user input with respect to the sensing region formed by sensor 108. Such measurement(s) can also be utilized by processing system 110, in some embodiments, to determine positional information with respect to a user input relative to the sensing region formed by sensor 108. Processing system 110 may be implemented as one or more integrated circuits and/or discrete components. In one embodiment, processing system 110 includes or is implemented within an application specific integrated circuit (ASIC). In accordance with the embodiments described herein, such an ASIC can include components and/or embedded logic instructions for performing elastance measurement(s) and determining contact and/or positional information with respect a sensing region of sensor 108.

The positional information determined by processing system 110 can be any suitable indicia of object presence. For example, the processing system can be implemented to determine "zero-dimensional" 1-bit positional information (e.g., near/far or contact/no contact) or "one-dimensional" positional information as a scalar (e.g., position or motion along a sensing region). Processing system 110 can also be implemented to determine multi-dimensional positional information as a combination of values (e.g., two-dimensional horizontal/vertical axes, three-dimensional horizontal/vertical/depth axes, angular/radial axes, or any other combination of axes that span multiple dimensions), and the like. Processing system 110 can also be implemented to determine information about time or history.

Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. The positional information from the processing system 110 facilitates a full range of interface inputs, including use of the proximity sensor device as a pointing device for cursor control, scrolling, and other functions.

Conductive routing traces 104 and 106 may each include one or more conductive coupling elements or traces. It is noted that some example embodiments of sensor electrode patterns, in accordance with the invention, are described herein in FIGS. 2A, 2B, 3A, 3B, 4A, and 4B. It is appreciated that the examples of FIGS. 2A, 2B, 3A, 3B, 4A, and 4B are provided by way of example and not of limitation. In general, any zero-dimensional, one-dimensional, or two-dimensional capacitive sensor electrode pattern can also be used in sensor 108 for measuring elastance. This includes both single layer and multi-layer electrode patterns.

Although described above with respect to a touch screen, elastive sensor device 100 can also be implemented as an elastive touchpad device. For example, substrate 102 of elastive sensor device 100 can be implemented with, but is not limited to, one or more clear or opaque materials that are utilized as a substrate for an elastive touchpad device. Likewise, clear or opaque conductive materials can also be utilized to form sensor electrodes in sensor 108.

Example Sensor Electrode Patterns in a Sensor

Figure 2A:
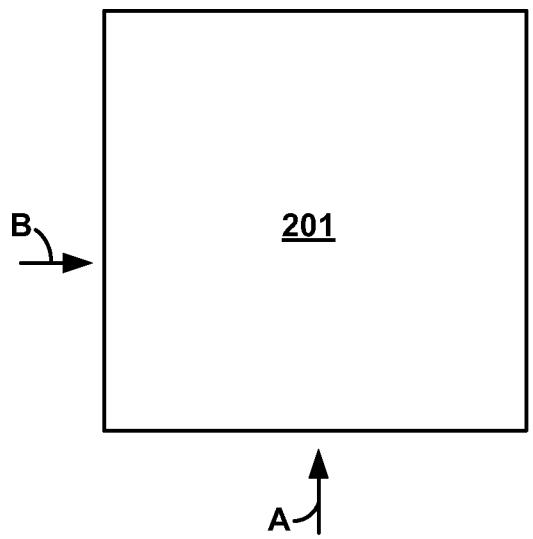
Figure 2B:
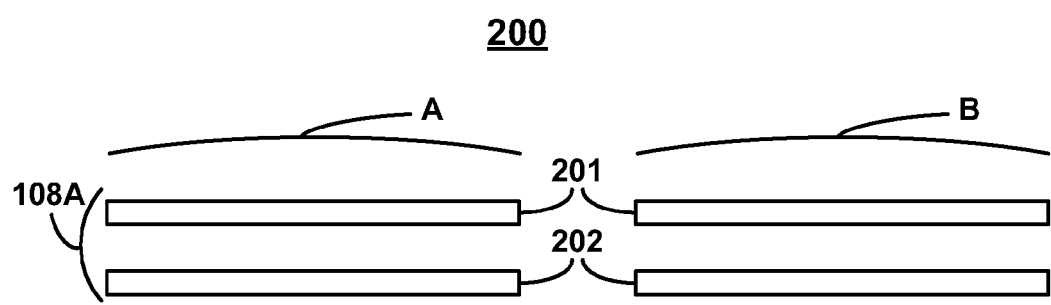
FIG. 2B illustrates a set of elevation details of the sensor of an example elastive sensor device, according to an embodiment.

FIG. 2A illustrates a plan view while FIG. 2B illustrates a set of elevation details of a sensor 108A of an example elastive sensor device, according to an embodiment. Sensor 108A represents an example of a sensor 108 that may be used with elastive sensor device 100 of FIG. 1. Portion A of FIG. 2B represents an elevation taken from the direction of arrow A of FIG. 2A, while portion B of FIG. 2B represents an elevation detail taken from the direction of arrow B of FIG. 2A. Sensor 108A includes a first sensor electrode 201 and a second sensor electrode 202, which are separated by a dielectric material (not illustrated). In the plan view of FIG. 2A, only sensor electrode 201 is visible as it completely overlaps sensor electrode 202. As can be seen, sensor 108A forms a zero-dimensional elastive sensor. The zero-dimensional elastive sensor can be utilized by processing system 110 as a transelastive button or as an elastive profile sensor, either of which can sense contact/proximity of an input object with respect to a sensing region formed by sensor 108A, but not positional information (other than occurrence of an input in the sensor position that is occupied by the button). In some embodiments, as described herein, only a single sensor electrode 201 or 202 may be required for both driving and sensing in order to measure elastance. This can be accomplished by forming sensor 108A with only one of these sensor electrodes, or by utilizing only one of the two electrodes for such an elastance measurement.

Figure 3A:
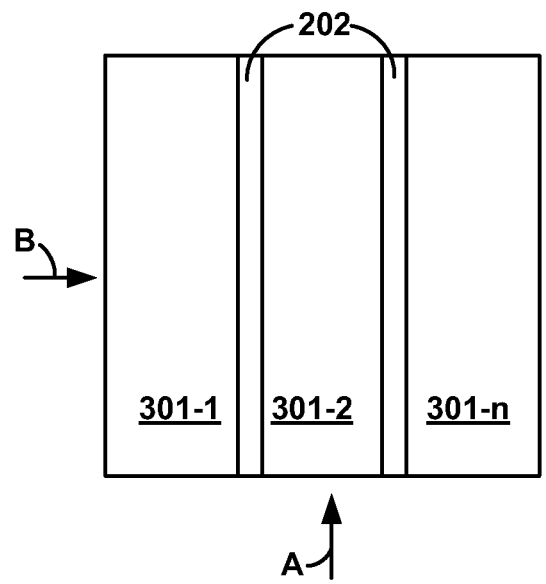
Figure 3B:
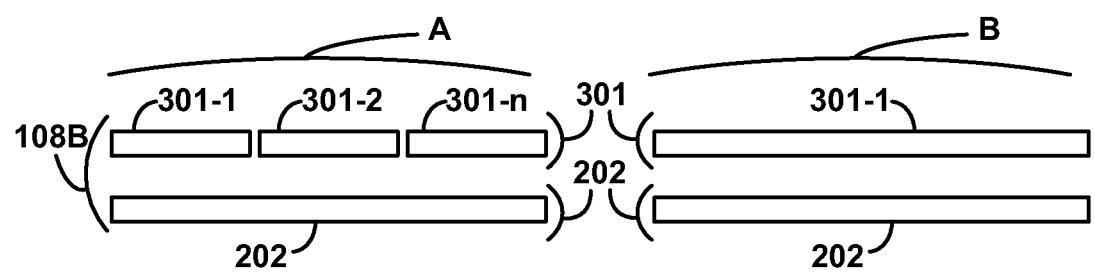
FIG. 3B illustrates a set of elevation details of the sensor of an example elastive sensor device, according to an embodiment.

FIG. 3A illustrates a plan view while FIG. 3B illustrates a set of elevation details of a sensor 108B of an example elastive sensor device, according to an embodiment. Sensor 108B represents an example of a sensor 108 that may be used with elastive sensor device 100 of FIG. 1. Portion A of FIG. 3B represents an elevation taken from the direction of arrow A of FIG. 3A, while portion B of FIG. 3B represents an elevation detail taken from the direction of arrow B of FIG. 3A. Sensor 108B includes a first set of sensor electrodes 301 and a second set of sensor electrodes 202, which are separated by a dielectric material (not illustrated). First set of sensor electrodes 301 comprises a plurality of sensor electrodes (301-1, 301-2 . . . 301-*n*) that are separated from one another by dielectric material (not illustrated). Although three sensor electrodes are illustrated in set 301, it is appreciated that in other embodiments set 301 can comprise two sensor electrodes or more than three sensor electrodes (e.g., 8, 16, 32, or some other number of sensor electrodes). Second set 202 includes only a single sensor electrode 202. Either of first set 301 or second set 202 may be disposed in closest proximity to substrate 102 of FIG. 1. As can be seen, sensor 108B forms a one-dimensional elastive sensor. The one-dimensional elastive sensor can be utilized by processing system 110 as a transelastive imaging sensor and/or as an elastive profile sensor, either of which can sense one contact, proximity, and/or one-dimensional position of one or more input objects with respect to a sensing region formed by sensor 108B. An example use of a one-dimension input is as a "slider" input or control interface. In a transelastive embodiment, processing system 110 can utilize sensor 108B to generate a transelastive image with respect to the sensing region formed by sensor 108B and to perform multitouch sensing and positional determination with respect to the sensing region formed by sensor 108B. In some embodiments, as described herein, one or more of sensor electrodes 202, 301-1, 301-2, 301-*n* may be utilized in order to measure elastance.

Figure 4A:
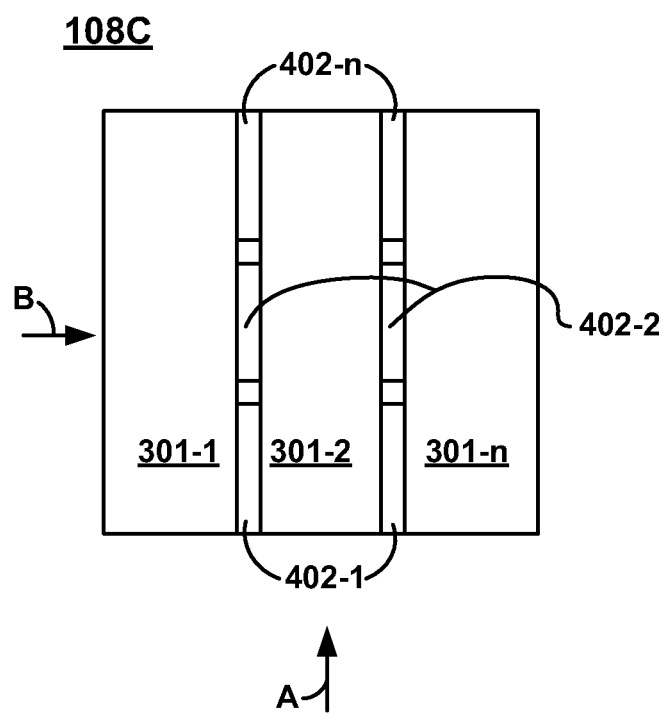
Figure 4B:
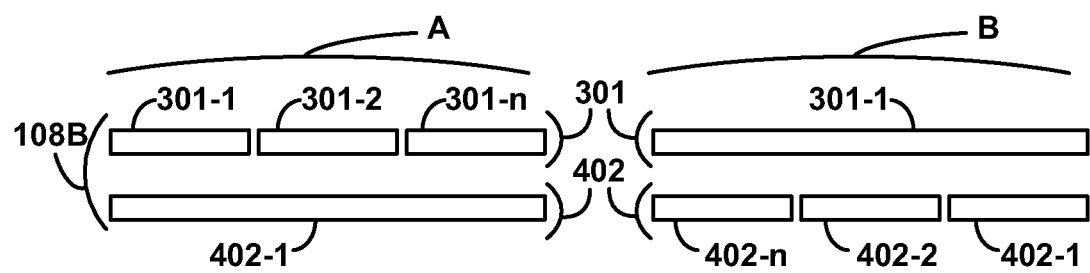
FIG. 4B illustrates a set of elevation details of the sensor of an example elastive sensor device, according to an embodiment.

FIG. 4A illustrates a plan view while FIG. 4B illustrates a set of elevation details of a sensor 108C of an example elastive sensor device, according to an embodiment. Sensor 108C represents an example of a sensor 108 that may be used with elastive sensor device 100 of FIG. 1. Portion A of FIG. 4B represents an elevation taken from the direction of arrow A of FIG. 4A, while portion B of FIG. 4B represents an elevation detail taken from the direction of arrow B of FIG. 4A. Sensor 108C includes a first set of sensor electrodes 301 and a second set of sensor electrodes 402, which are separated by a dielectric material (not illustrated). First set of sensor electrodes 301 comprises a plurality of sensor electrodes (301-1, 301-2 . . . 301-*n*) that are separated from one another by dielectric material (not illustrated). Second set of sensor electrodes 402 comprises a plurality of sensor electrodes (402-1, 402-2 . . . 402-*n*) that are separated from one another by dielectric material (not illustrated). Although three sensor electrodes are illustrated in first set 301 and again in second set 402, it is appreciated that in other embodiments first set 301 and/or second set 402 can comprise two sensor electrodes or more than three sensor electrodes (e.g., 8, 16, 32, or some other number of sensor electrodes). Either of first set 301 or second set 402 may be disposed in closest proximity to substrate 102 of FIG. 1. As can be seen, sensor 108C forms a two-dimensional elastive sensor. The two-dimensional elastive sensor can be utilized by processing system 110 as an x-y touchpad or touch screen in the form of a transelastive imaging sensor or and/or an elastive profile sensor, either of which can sense at least one of contact, proximity, and/or one-dimensional position of one or more input objects with respect to a sensing region formed by sensor 108C. In a transelastive embodiment, processing system 110 can utilize a sensing region formed by sensor 108C to generate a transelastive pixel image with respect to the sensing region of sensor 108C and to perform multitouch sensing and positional determination with respect to the sensing region of sensor 108C. In some embodiments, as described herein, one or more of sensor electrodes 301-1, 301-2, 301-*n*, 402-1, 402-2, 402-*n* may be utilized in order to measure elastance.

Example Images in Elastance and Capacitance Space

Elastive sensing, as described herein, is more globally interrelated (an input in one location affects measurements in multiple portions of a sensing region) than capacitive sensing (which is very localized), and in some modes elastive sensing can be susceptible to interference to which capacitive sensing is not as susceptible. For at least these reasons the embodiments described herein would not have been obvious to attempt. However, after practicing embodiments herein, it has become apparent that elastive sensing also exhibits some advantages, as compared to capacitive sensing. For example, one drawback of a transcapacitive sensing system is the limitation on the dynamic range of its input signal (which is a charge, Q, in a drive voltage measure charge (DVMQ) methodology). This limitation is imposed in part to the maximum size of a feedback capacitor which can be physically fit into the circuitry or onto the silicon that is used to implement the input amplifier of a transcapacitive sensing system. Additionally, as this capacitor is fixed in size a variable gain amplifier stage must be added to a transcapacitive sensing device's input amplifier in order to adjust for different ranges of capacitance which may be measured. With transelastive sensing, in the drive charge measure voltage (DQMV) methodology, voltage is being measured as an input rather than charge. Thus, no feedback capacitor is needed in the input amplifier. Additionally, the input amplifier in a transelastive sensing device's processing system can simply be implemented as a variable gain amplifier rather than adding a separate variable gain amplifier stage as with transcapacitive sensing device's processing system, thus reducing complexity and components.

Absolute elastive sensing and transelastive sensing are two types of elastive sensing. Absolute elastive sensing involves both driving and sensing with the same sensor electrode.

Absolute elastance measurement, in one embodiment, involves sourcing a charge pulse onto a sensor electrode(s) and then determining elastance via measurement of a voltage induced into the same sensor electrode(s). With reference to FIGS. 2A and 2B, in one embodiment, processing system 110 sources a charge pulse into either sensor electrode 201 or 202. Processing system 110 determines an elastance by measurement of a voltage induced into the same electrode into which the charge was sourced.

Figure 5:
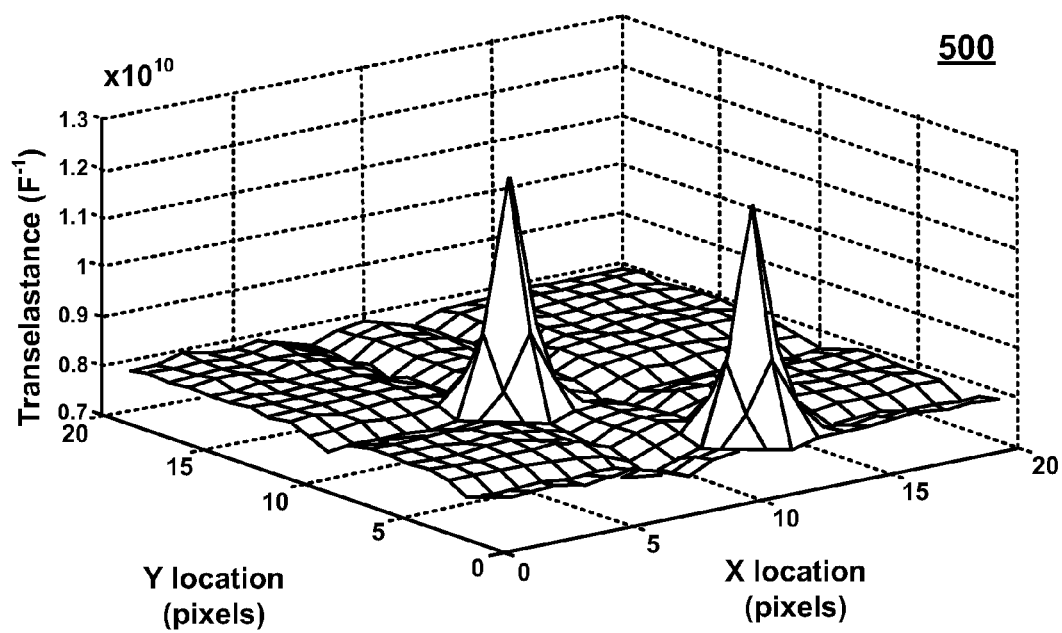
FIG. 5 illustrates an example multitouch transelastive image in the mutual elastance space of a sensor's sensing region, according to an embodiment.
Figure 6:
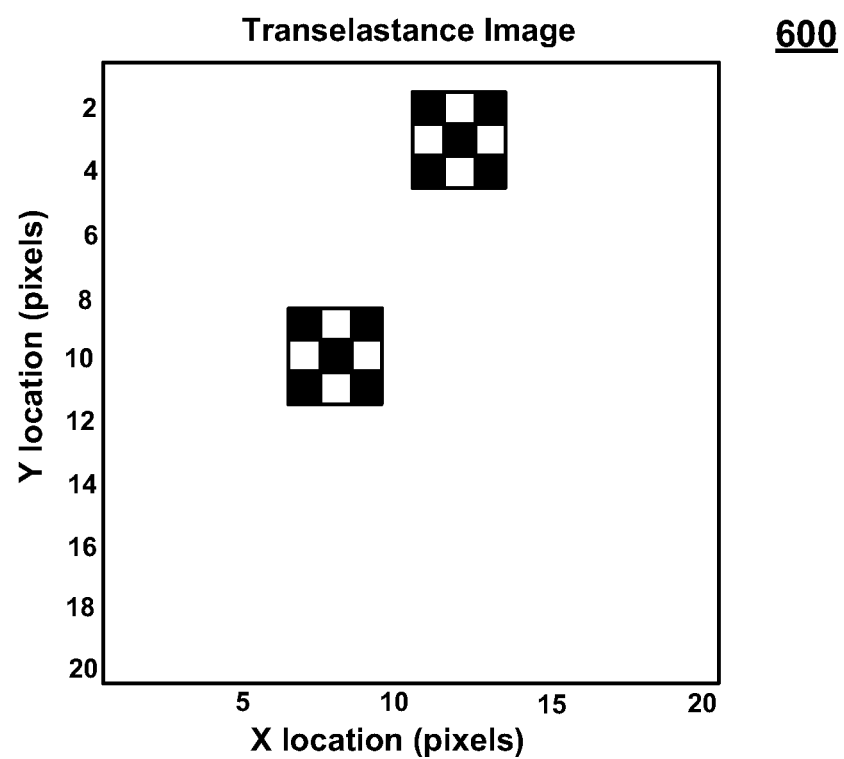
FIG. 6 illustrates an example multitouch transelastive pixel image, according to an embodiment.

FIGS. 5 and 6 illustrate one form of transelastive sensing, in which a transelastive image is produced of a sensor's sensing region.

FIG. 5 illustrates an example multitouch transelastive image 500 in the mutual elastance space of a sensor's sensing region, according to an embodiment. This is referred to herein as transelastive imaging (TEI) and can be used as an alternative to transcapacitive imaging (TCI), which is briefly described in conjunction with FIGS. 7 and 8 for comparative purposes. TEI is one form of multitouch transelastive sensing. Multitouch image 500, of FIG. 5 shows a simulated image frame of a 20×20 pixel touch interface (e.g., a sensor 108) for an elastive sensor device, such as elastive sensor device 100. In FIG. 5, the x and y axes represent an array of pixels, while the z axis represents a scale of Darafs. Upward spikes, in the form of a change in measured Darafs, occur in the two locations of touches, while valleys occur on x and y axes that intersect with these upward spikes. These valleys occur because of the nature of elastance being global with respect to other pixels in the sensing interface.

FIG. 6 illustrates an example multitouch transelastive pixel image 600, according to an embodiment. Pixel image 600 is an x-y pixel image of the multitouch transelastive image 500. As can be seen, shading changes in the pixel image correlate with the upward spikes and valleys in multitouch transelastive image 500. The most intense shading changes are in two 3×3 pixel regions and correlate to the touch spikes of multitouch transelastive image 500.

Figure 7:
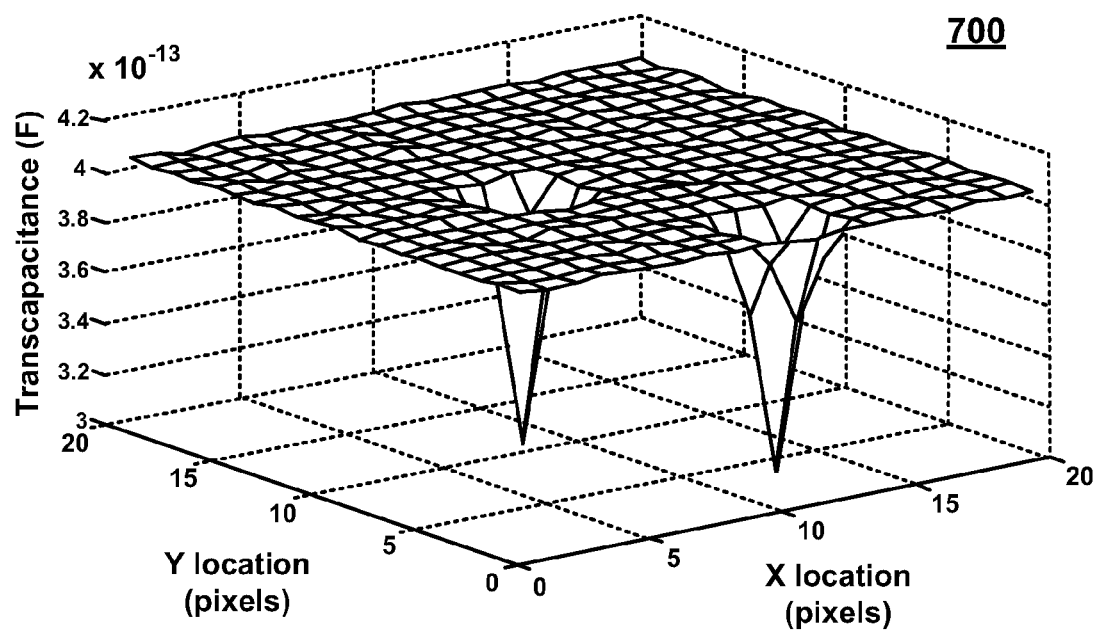
FIG. 7 illustrates an example transcapacitive multitouch image in the mutual capacitance space of a sensor's sensing region.

FIG. 7 illustrates an example transcapacitive multitouch image 700 in the mutual capacitance space of a sensor's sensing region. Multitouch image 700 shows a simulated image frame of a 20×20 pixel touch interface (e.g., sensor 108) for a capacitive sensing device. Multitouch image 700 is a TCI equivalent of multitouch image 500 of FIG. 5 and has been provided for contrast and comparison. In FIG. 7, the x and y axes represent an array of pixels, while the z axis represents a scale of Farads. Downward spikes, in the form of a change in measured Farads, occur in the two locations of touches, while no valleys occur on x and y axes that intersect with these spikes. The downward spikes are opposite to the upward spikes in multitouch image 500 because of the inverse nature of transelastive sensing and transcapacitive sensing. The absence of reciprocal peaks or valleys on the x and y axes of multitouch image 700 is due to capacitive changes being very localized in nature as compared to the global fluctuations and interrelationships that occur due to changes in elastance.

Figure 8:
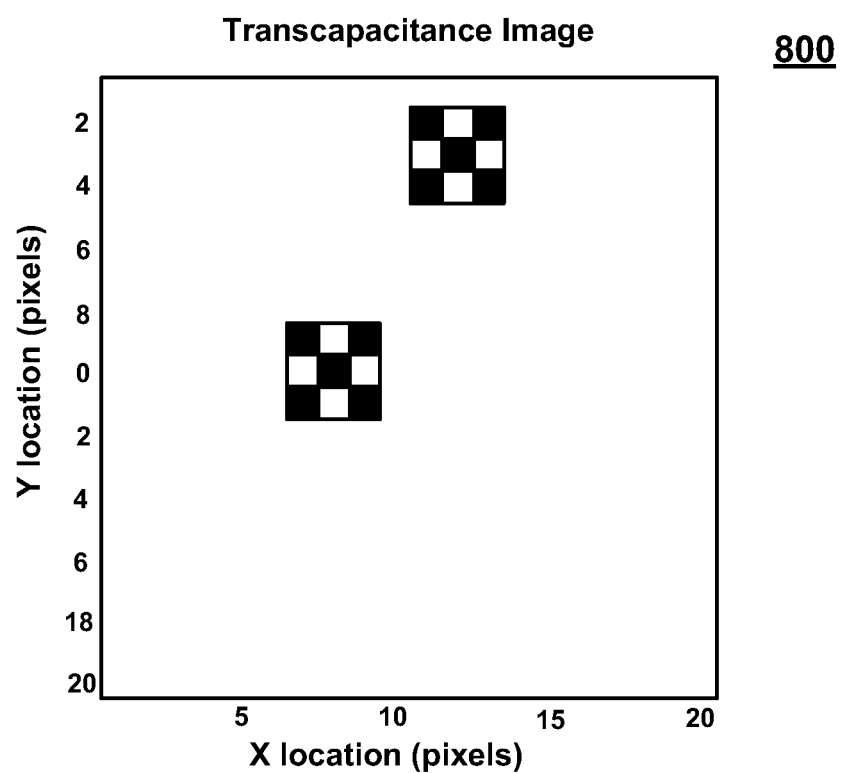
FIG. 8 illustrates an example multitouch transcapacitive pixel image.

FIG. 8 illustrates an example multitouch transcapacitive pixel image 800. Pixel image 800 is an x-y pixel image of the transcapacitive multitouch image 700. As can be seen shading changes in the pixel image correlate with the downward spikes in transcapacitive multitouch image 700. The most intense shading changes are in two 3×3 pixel regions and correlate to the touch spikes of transcapacitive multitouch image 700. A comparison to multitouch transelastive pixel image 600 shows that similar pixel images can be generated with TEI and TCI approaches. The comparison also shows that multitouch transcapacitive pixel image 800 does not have equivalent shading related to valleys as was seen in multitouch transelastive pixel image 600. As previously discussed, this absence is due to the more localized nature of capacitive changes in response to inputs.

Measuring Elastance

In an elastive sensor device, as described herein, elastance measurements are performed and positional information determinations are made by a processing system, such as processing system 110. Thus, in some embodiments, the described techniques for measuring and/or interpreting elastance are, or can be, embedded as logic or instructions within memory or silicon of, or accessibly by, processing system 110. For example, instructions for performing elastive measurements and positional information determinations can be tangibly stored in an ASIC of processing system 110.

As described herein, absolute elastive sensor systems are structurally similar to corollary absolute capacitive sensor systems and transelastive sensor systems are structurally similar to their corollary transcapacitive sensor systems, except that in both elastive systems elastance is measured rather than capacitance. In one embodiment, elastive sensor device 100 can be implemented as a transelastive sensor device. In such an embodiment, the image sensor used in sensor 108 consists of m drive channel sensor electrodes and n sense channel sensor electrodes. The driving and sensing sensor electrodes can be disposed on the same two-dimensional layer as one another, or disposed on separate two-dimensional layers that are separated by an insulating material. Therefore, the image sensor is basically a system of m+n conductors. Neglecting the electrical resistance of the conductors, this system can be electrically described in terms of conductor voltages, charges, and elastance matrix by a system of linear equations as follows:

$$V = S \cdot Q \text{ or}$$

$$\begin{bmatrix} v_{D1} \\ v_{D2} \\ \vdots \\ v_{Dm} \\ v_{S1} \\ v_{S2} \\ \vdots \\ v_{Sn} \end{bmatrix} = \begin{bmatrix} s_{D11} & s_{D12} & \cdots & s_{D1m} & s_{D1S1} & s_{D1S2} & \cdots & s_{D1Sn} \\ s_{D21} & s_{D22} & \cdots & s_{D2m} & s_{D2S1} & s_{D2S2} & \cdots & s_{D2Sn} \\ \vdots & \vdots & \ddots & \vdots & \vdots & \ddots & \vdots \\ s_{Dm1} & s_{Dm2} & \cdots & s_{Dmm} & s_{DmS1} & s_{DmS2} & \cdots & s_{DmSn} \\ s_{S1D1} & s_{S1D2} & \cdots & s_{S1Dm} & s_{S11} & s_{S12} & \cdots & s_{S1n} \\ s_{S2D1} & s_{S2D2} & \cdots & s_{S2Dm} & s_{S21} & s_{S22} & \cdots & s_{S2n} \\ \vdots & \vdots & \ddots & \vdots & \vdots & & \vdots \\ s_{SnD1} & s_{SnD2} & \cdots & s_{SnDm} & s_{Sn1} & s_{Sn2} & \cdots & s_{Snn} \end{bmatrix} \begin{bmatrix} q_{D1} \\ q_{D2} \\ \vdots \\ q_{Dm} \\ q_{S1} \\ q_{S2} \\ \vdots \\ q_{Sn} \end{bmatrix}$$

where V is a vector of conductor voltages, Q is a vector of conductor charges, and S is the elastance matrix of the conductor system. The elastance matrices of physical systems are diagonally symmetric, in other words:

$$s_{xy} = s_{yx}, x=1 \ldots m+n, y=1 \ldots m+n$$

In this elastance matrix, charge (q) is driven onto drive channel sensor electrodes as input and voltage (v) is read on the sense channel sensor electrodes, and s is a proportionality factor or elastance (shown as the elastance matrix), which relates charge to voltage.

The objective of a transelastance system is to measure the mutual elastances between each drive channel sensor electrode and each sense channel sensor electrode that are utilized. These m×n mutual elastances are located in the upper right or lower left quarter of the elastance matrix. In one embodiment, in order to measure the mutual elastance of a pixel, the drive channel associated with the pixel is charged to a known amount (q) by a current pulse from the transelastive processing system (e.g., processing system 110) while all other drive and sense channels sensor electrodes are kept float. This means that the net charge on every sensor electrode channel, except the active drive channel sensor electrode(s), does not change. The voltage of the sense channel(s) ($v_s$) associated with the elastic pixel is then measured. Provided that the coupling between sense channels sensor electrodes is negligible, the voltages of all or a portion of sense channels can be measured at the same time, reading the information from all pixels on the active drive channels sensor electrodes. Under these conditions, the system of linear equations described above, is reduced to the following (assuming the ith drive channel sensor electrode is charged, $q_{Di} = q$):

$$v_{S1} = s_{S1Di} q \rightarrow s_{S1Di} = v_{S1}/q$$
$$v_{S2} = s_{S2Di} q \rightarrow s_{S2Di} = v_{S2}/q$$
$$\vdots$$
$$v_{Sj} = s_{SjDi} q \rightarrow s_{SjDi} = v_{Sj}/q$$
$$\vdots$$
$$v_{Sn} = s_{SnDi} q \rightarrow s_{SnDi} = v_{Sn}/q$$

Therefore, the mutual elastance of each elastive pixel on the ith drive channel sensor electrode is calculated. This data can be used by processing system 110 to construct the transelastance image of the sensor. Although the data used are different, such transelastive image construction is accomplished in a similar manner to that of transcapacitive image construction.

Figure 9:
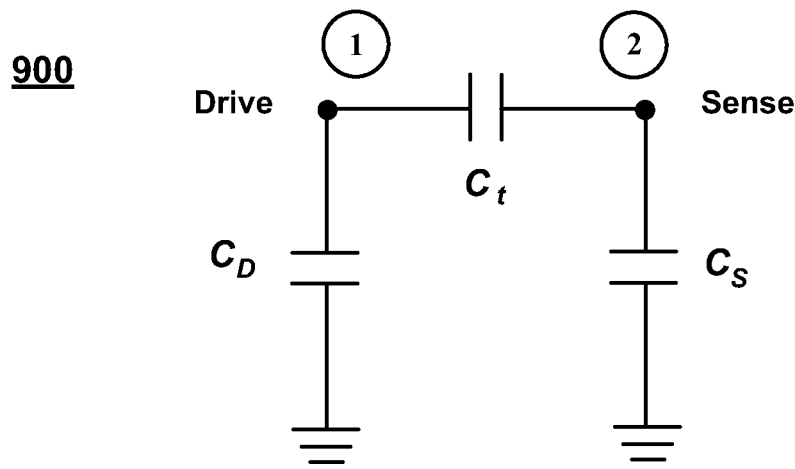
FIG. 9 illustrates a simplified equivalent pixel of a transelastive or transcapacitive pixel, according to an embodiment.

FIG. 9 illustrates a simplified equivalent pixel 900 of a transelastive or transcapacitive pixel, according to various embodiments. Simplified equivalent pixel 900 is illustrated to provide an understanding of how the mutual elastance of each pixel relates to the mutual capacitance of that same pixel. Although the elastance matrix is the inverse of the capacitance matrix, the relation between individual elements is more complex. Simplified equivalent pixel 900 shows a simplified equivalent circuit of a pixel that includes a drive channel sensor electrode ($C_D$), a sense channel sensor electrode ($C_S$), a first node (1), a second node (2), and the capacitance between the two ($C_t$). With reference to simplified equivalent pixel 900, the elements of a capacitance matrix, for such a pixel can be represented as:

Drive Channel Self-Capacitance: $C_{11}=C_D+C_t$

Sense Channel Self-Capacitance: $C_{22}=C_S+C_t$

Drive-Sense Channel Mutual Capacitance:
$C_{12}=C_{21}=-C_t$ while the elements of the elements of an elastance matrix, for such the pixel can be represented as:

Drive Channel Self-Elastance: $S_{11} = \dfrac{C_S + C_t}{C_D C_S + C_D C_t + C_S C_t}$ Sense Channel Self-Elastance: $S_{22} = \dfrac{C_D + C_t}{C_D C_S + C_D C_t + C_S C_t}$ Drive-Sense Channel Mutual Elastance: $S_{12} =$ $$S_{21} = \frac{C_t}{C_D C_S + C_D C_t + C_S C_t}$$

Based on the above descriptions of elastance measurement, it should be evident that processing system 110 can be configured to measure both self-elastance (which can also be referred to as absolute elastance) and mutual elastance (which can also be referred to as transelastance). Self-elastance involves sensing on the same sensor electrode that is driving (transmitting), while mutual elastance involves measuring elastance between two sensor electrodes. In various embodiments, these two types of elastance measurements can be used independently or in combination. Likewise, it should be appreciated that in some embodiments, a device, such as elastive sensor device 100 can be configured to measure elastance, or capacitance, or both elastance and capacitance with respect to sensor electrodes in sensor 108. Additionally, although the above description of elastance measurement concentrated on elastance measurement using a DQMV measurement methodology, it is appreciated that with more complex calculations elastance can be measured using a DVMQ methodology. The DVMQ measurement methodology can be utilized by dividing voltage by charge to realize a measurement of elastance.

As with measurements of capacitance, various combinations of sensor electrodes can be driven and sensed in order to achieve a variety of elastance measurements. It is also anticipated that virtually any sensor electrode pattern that could be used in sensor 108 for the measurement of capacitance could also be utilized to measure elastance in the manner described herein. The elastive measurement combinations and techniques employed by a particular elastive sensor device, such as elastive sensor device 100, would be dictated by the measurement instructions stored in processing system 110.

For example, with reference to FIGS. 1-4, for a given set of sensor electrodes (e.g., those of sensor 108A, 108B, 108C, or the like), processing system 110 can acquire an elastive measurement by emitting an electrical signal with a first subset of the given set of sensor electrodes and then receiving the resulting electrical signal with a second subset of the given set of sensor electrodes. In various embodiments the emitted electrical signal results from a sourced charge pulse and the elastive measurement comprises a measurement of resulting voltage induced and measured with respect to the emitting sensor electrode subset or one or more other sensor electrodes in the same sensor 108. In this manner, one or more measurements of self-elastance and/or mutual elastance can be achieved. Processing system 110 can then determine proximity, contact, and/or positional information using the elastive measurement(s).

With reference to FIGS. 2A and 2B, elastance measurement(s) achieved by processing system 110 can comprise one or more of: emitting with sensor electrode 201 and receiving with sensor electrode 201; emitting with sensor electrode 202 and receiving with sensor electrode 202; emitting with sensor electrode 201 and receiving with sensor electrode 202; and emitting with sensor electrode 202 and receiving with sensor electrode 201. It is appreciated that any sensor electrode that is not being used to emit may be used to receive during all or part of the time period while the other sensor electrode is emitting and/or may be electrically floated during all or part of the time period while another sensor electrode is emitting. As used herein, "electrically floated/floating" or "floated/floating", means that there is no ohmic contact between the floated electrode and other circuit elements of the input device, so that no meaningful amount of charge can flow onto or off of the floating electrode under normal circumstances With reference to FIGS. 3A and 3B, elastance measurement(s) achieved by processing system 110 can comprise one or more of: emitting with any one or combination of the illustrated sensor electrodes and receiving with the same sensor electrode(s); emitting with sensor electrode 202 and receiving with one or more of sensor electrodes 301-1, 301-2, . . . 301-n (more being either all at once, in subsets, or in a sequentially scanned fashion); and emitting with one or more of sensor electrodes 301-1, 301-2, . . . 301-n (more being either in subsets, all at once, in a sequentially scanned fashion, or with multiple sensor electrodes simultaneously emitting signals which differ in phase) while receiving with sensor electrode 202. It is appreciated that any or all sensors electrodes that are not being used to emit may be used to receive during all or part of the time period while another sensor electrode(s) is emitting and/or may be electrically floated during all or part of the time period while another sensor electrode(s) is emitting. When a plurality of sensor electrodes is electrically floated, they are typically floated at the same potential.

With reference to FIGS. 4A and 4B, elastance measurement(s) achieved by processing system 110 can comprise one or more of: emitting with any one or combination of the illustrated sensor electrodes and receiving with the same sensor electrode(s); emitting with one or more (either all at once, in subsets, or a sequentially scanned fashion) of sensor electrodes 402-1, 402-2, . . . 402-n and receiving with one or more of sensor electrodes 301-1, 301-2, . . . 301-*n* (more being either in subsets, all at once, or in a sequentially scanned fashion); emitting with one or more (either all at once, in subsets, or a sequentially scanned fashion) of sensor electrodes 301-1, 301-2, . . . 301-*n* and receiving with one or more of sensor electrodes 402-1, 402-2, . . . 402-*n* (more being either in subsets, all at once, or in a sequentially scanned fashion). Additionally, when multiple electrodes are used for emitting simultaneously, the electrical signals emitted can differ in phase. It is appreciated that any or all sensors electrodes that are not being used to emit may be used to receive during all or part of the time period while another sensor electrode(s) is emitting and/or may be electrically floated during all or part of the time period while another sensor electrode(s) is emitting. When a plurality of sensor electrodes is electrically floated, they are typically floated at the same potential.

Given the sensor electrode configurations of FIGS. 2A, 2B, 3A, 3B, 4A, and 4B other combinations of sensor electrodes may be utilized to emit and receive signals for achieving elastive measurements. Additionally, multiple elastive measurements may be obtained either simultaneously or sequentially and used by processing system 110 in an aggregated fashion to determine proximity, contact, and/or positional information relative to a sensor 108. For example, a transelastive pixel image may be formed from a plurality of elastive measurements. Clearly, the example sensor electrode configurations of FIGS. 2A, 2B, 3A, 3B, 4A, and 4B are provided by way of example and not of limitation and other configurations are anticipated including configurations of sensor electrodes that are interleaved, interdigitated, interwoven, or disposed in a single layer rather than in multiple layers as illustrated.

Example Methods of Operation

Figure 10:
FIG. 10 is a flow diagram of an example method of ascertaining positional information of an input object, according to an embodiment.

The following discussion sets forth in detail the operation of example methods of operation of embodiments. With reference to FIG. 10, flow diagram 1000 illustrates example procedures used by various embodiments. Flow diagram 1000 includes some procedures that, in various embodiments, are carried out by a processor such as an ASIC under the control of computer-readable and computer-executable instructions. In this fashion, all or part of flow diagram 1000 can implemented using a computer or processing system, such as processing system 110, in various embodiments. The computer-readable and computer-executable instructions can reside in any tangible computer readable storage media, such as, for example, memory, logic, and/or silicon of processing system 110. These computer-readable and computer-executable instructions, are used to control or operate in conjunction with, for example, some portion of processing system 110, such as a processor or ASIC. Although specific procedures are disclosed in flow diagram 1000, such procedures are examples. That is, embodiments are well suited to performing various other procedures or variations of the procedures recited in flow diagram 1000 and described below. Likewise, in some embodiments, the procedures in flow diagram 1000 (along with those described below) may be performed in an order different than presented and/or not all of the procedures described in flow diagram 1000 may be performed.

FIG. 10 is a flow diagram 1000 of an example method of ascertaining positional information of an input object, according to an embodiment. Flow diagram 1000 also describes a method of using elastive sensor device 100 and processing system 110, according to an embodiment. Procedures of flow diagram 1000 are described below, with reference to elements of FIGS. 1-4.

At 1010 of flow diagram 1000, in one embodiment, an elastive measurement is acquired by emitting an electrical signal with a first subset of a set of sensor electrodes of an elastive sensor device and receiving the electrical signal with a second subset of the set of sensor electrodes. In one embodiment, the emitted electrical signal is emitted as a result of processing system 110 sourcing one or more charge pulses on the first sensor electrode subset and the resulting electrical signal that is received with the receiving sensor electrode subset is a voltage that is induced at the second sensor electrode subset. The received voltage represents an elastive measurement, as has previously been described herein. With reference to FIGS. 1 and 4, in one embodiment, this can comprise processing system 110 of elastive sensor device 100 emitting an electrical signal with one or more of sensor electrodes 301-1, 301-2, . . . 301-*n* and/or 402-1, 402-2, . . . 402-*n* and then receiving a resulting electrical signal with one or more of sensor electrodes 301-1, 301-2, . . . 301-*n* and/or 402-1, 402-2, . . . 402-*n*. The emitting and receiving electrodes can be the same or different single and/or groupings of these sensor electrodes. For example, emitting and receiving groupings of sensor electrodes may be exactly the same, completely different, or may differ by as little as one sensor electrode. It is appreciated that these are just a few of numerous manners of emitting and receiving with sensor electrodes, and reference is made to other non-inclusive methods that have been previously described herein with respect to FIGS. 2A, 2B, 3A, 3B, 4A, and 4B.

In some embodiments the elastive measurement is acquired by emitting the electrical signal during a first time period with at least a first sensor electrode of the first subset of sensor electrodes and electrically floating a second sensor electrode of the first subset of the sensor electrodes during the first time period. For example, with reference again to FIGS. 4A and 4B, consider an embodiment where set 301 is the first set of sensor electrodes and set 402 is the second set of sensor electrodes. In one such embodiment, processing system 110 emits the electrical signal with sensor electrode 301-1 for a first time period while electrically floating sensor electrodes 301-2 to 301-*n* during all or part of this first time period. Additionally, one or more of sensor electrodes 402-1, 402-2, . . . 402-*n* may also be electrically floated for all or part of this first time period. As previously described, all floated electrodes may be held at the same potential as one another while floating.

At 1020 of flow diagram 1000, in one embodiment, positional information of an input object is determined using the elastive measurement. As described herein, in one embodiment, this can comprise processing system 110 producing a transelastive pixel image using the elastive measurement (possible in conjunction with one or more additional elastive measurements). Producing a transelastive pixel image allows for determining positional information with respect to multiple simultaneous input objects relative to a sensor 108. Additionally, in some embodiments, processing system 110 utilizes the elastive measurement to determine one or more of proximity of an input object or contact of an input object with respect to a sensor 108. For example, in a zero-dimensional button embodiment, the elastive measurement is used to determine contact and that the position of the contact was on the zero-dimensional button.

The foregoing descriptions of specific embodiments have been presented for purposes of illustration and description. They are not intended to be exhaustive or to limit the presented technology to the precise forms disclosed, and obviously many modifications and variations are possible in light of the above teaching. The embodiments were chosen and described in order to best explain the principles of the presented technology and its practical application, to thereby enable others skilled in the art to best utilize the presented technology and various embodiments with various modifications as are suited to the particular use contemplated.

What is claimed is:

1. An elastive sensor device comprising:
   a set of sensor electrodes; and
   a processing system configured to acquire an elastive measurement by emitting an electrical signal with a first subset of said set of sensor electrodes and receiving said electrical signal with a second subset of said set of sensor electrodes, said processing system further configured to determine positional information using said elastive measurement.

2. The elastive sensor device of claim 1, wherein said processing system is further configured to acquire said elastive measurement by emitting a second electrical signal with a third subset of said set of sensor electrodes and receiving said second electrical signal with said first subset of said set of sensor electrodes, wherein said first subset and third subset differ by at least one sensor electrode and said first subset and said second subset comprise a single sensor electrode.

3. The elastive sensor device of claim 2, wherein said electrical signal results from a sourced charge pulse and wherein said elastive measurement comprises a measurement of a voltage induced at said second subset of said set of sensor electrodes.

4. The elastive sensor device of claim 1, wherein said first subset comprises a single electrode and said second subset comprises said single electrode.

5. The elastive sensor device of claim 1, wherein said first subset comprises at least one sensor electrode and said second subset comprises a plurality of sensor electrodes.

6. The elastive sensor device of claim 1, wherein said first subset comprises a first sensor electrode and a second sensor electrode, and wherein said processing system is further configured to acquire said elastive measurement by emitting said electrical signal during a first time period with said first sensor electrode while electrically floating said second sensor electrode.

7. An elastive sensor device comprising:
   a first set of sensor electrodes;
   a second set of sensor electrodes; and
   a processing system configured to acquire an elastive measurement by emitting an electrical signal with at least one sensor electrode of said first set of sensor electrodes and receiving said electrical signal with at least one sensor electrode of said second set of sensor electrodes, said processing system further configured to determine positional information using said measurement.

8. The elastive sensor device of claim 7, wherein said processing system is further configured to acquire a second elastive measurement by emitting a second electrical signal with said at least one sensor electrode of said second set and receiving said second electrical signal with said at least one sensor electrode of said second set, and wherein said processing system is further configured to determine said positional information using said second elastive measurement.

9. The elastive sensor device of claim 7, wherein said processing system is further configured to acquire said elastive measurement by emitting a second electrical signal with a second at least one sensor electrode of said first set and receiving said electrical signal with said at least one sensor electrode of said second set, wherein said electrical signal and said second electrical signal differ in phase.

10. The elastive sensor device of claim 7, wherein said processing system is further configured to acquire said elastive measurement by electrically floating at least one sensor electrode of said first set of sensor electrodes, and wherein said electrically floating and said emitting an electrical signal overlap for a period of time.

11. The elastive sensor device of claim 7, wherein said electrical signal results from a sourced charge pulse and wherein said elastive measurement comprises a measurement of a voltage induced at said at least one sensor electrode of said second set of sensor electrodes.

12. The elastive sensor device of claim 7, wherein said receiving comprises receiving said electrical signal with a plurality of sensor electrodes of said second set of sensor electrodes.

13. The elastive sensor device of claim 7, wherein said emitting comprises emitting said electrical signal with a plurality of sensor electrodes of said first set of sensor electrodes.

14. The elastive sensor device of claim 7, wherein said emitting is performed by a plurality of sensor electrodes of said first set of sensor electrodes and said receiving is performed by a plurality of sensor electrodes of said second set of sensor electrodes, and wherein said first set of sensor electrodes and said second set of sensor electrodes comprise different sensor electrodes.

15. The elastive sensor device of claim 7, wherein said emitting is performed by sequentially driving, in a scanned fashion, different single electrodes of said first set of sensor electrodes while continually performing said receiving with at least one sensor electrode of said second set of sensor electrodes.

16. The elastive sensor device of claim 7, wherein said receiving is performed by sequentially receiving in a scanned fashion with different at least one sensor electrodes of said second set of sensor electrodes while continually driving at least one sensor electrode of said first set of sensor electrodes.

17. A method of ascertaining positional information of an input object, said method comprising:
   acquiring an elastive measurement by emitting an electrical signal with a first subset of a set of sensor electrodes of an elastive sensor device and receiving said electrical signal with a second subset of said set of sensor electrodes; and
   determining said positional information of said input object using said elastive measurement.

18. The method as recited in claim 17, wherein acquiring an elastive measurement by emitting an electrical signal with a first subset of a set of sensor electrodes of an elastive sensor device and receiving said electrical signal with a second subset of said set of sensor electrodes comprises:
   acquiring said elastive measurement by emitting said electrical signal in the form of a sourced charge pulse and measuring a voltage induced at said second subset of said set of sensor electrodes.

19. The method as recited in claim 17, wherein said acquiring an elastive measurement by emitting an electrical signal with a first subset of a set of sensor electrodes of an elastive sensor device and receiving said electrical signal with a second subset of said set of sensor electrodes comprises:

acquiring said elastive measurement by emitting said electrical signal with said first subset of said set of sensor electrodes and receiving said electrical signal with said second subset of said set of sensor electrodes, wherein said first subset and said second subset are the same.

20. The method as recited in claim 17, wherein said acquiring an elastive measurement by emitting an electrical signal with a first subset of a set of sensor electrodes of an elastive sensor device and receiving said electrical signal with a second subset of said set of sensor electrodes comprises:

acquiring said elastive measurement by emitting said electrical signal with said first subset of said set of sensor electrodes and receiving said electrical signal with said second subset of said set of sensor electrodes, wherein said first subset and said second subset differ by at least one sensor electrode.

21. The method as recited in claim 20, wherein said first subset comprises a first and second sensor electrode, and wherein said acquiring said elastive measurement by emitting said electrical signal with said first subset of said set of sensor electrodes and receiving said electrical signal with said second subset of said set of sensor electrodes, wherein said first subset and said second subset are different comprises:

acquiring said elastive measurement by emitting said electrical signal during a first time period with said first sensor electrode of said first subset of said sensor electrodes; and electrically floating said second sensor electrode of said first subset of said sensor electrodes during said first time period.

\* \* \* \* \*

UNITED STATES PATENT AND TRADEMARK OFFICE
CERTIFICATE OF CORRECTION

PATENT NO. : 9,891,757 B2
APPLICATION NO. : 12/643125
DATED : February 13, 2018
INVENTOR(S) : Alireza Modafe It is certified that error appears in the above-identified patent and that said Letters Patent is hereby corrected as shown below:

In the Claims

Claim 16, Column 14, Lines 39 and 40 read "...receiving is performed by sequentially receiving in a scanned fashion with a different at least one sensor electrode...", but should read -- ...receiving is performed by sequentially receiving, in a scanned fashion, with a different at least one sensor electrode... --.

Signed and Sealed this
Fourth Day of June, 2019

Andrei Iancu
*Director of the United States Patent and Trademark Office*